Dec. 17, 1968    J. TORSIELLO ET AL    3,416,429
FOOD DISPENSING MACHINE

Filed Oct. 14, 1966    5 Sheets-Sheet 1

INVENTORS
LAWRENCE REISS, DECEASED,
By LINDA REISS KIRSCHNER, EXECUTRIX.
JOSEPH TORSIELLO

By Kenyon & Kenyon
ATTORNEYS

Dec. 17, 1968   J. TORSIELLO ET AL   3,416,429
FOOD DISPENSING MACHINE

Filed Oct. 14, 1966   5 Sheets-Sheet 2

INVENTORS
LAWRENCE REISS, DECEASED,
By LINDA REISS KIRSCHNER, EXECUTRIX.
JOSEPH TORSIELLO

By Kenyon & Kenyon
ATTORNEYS

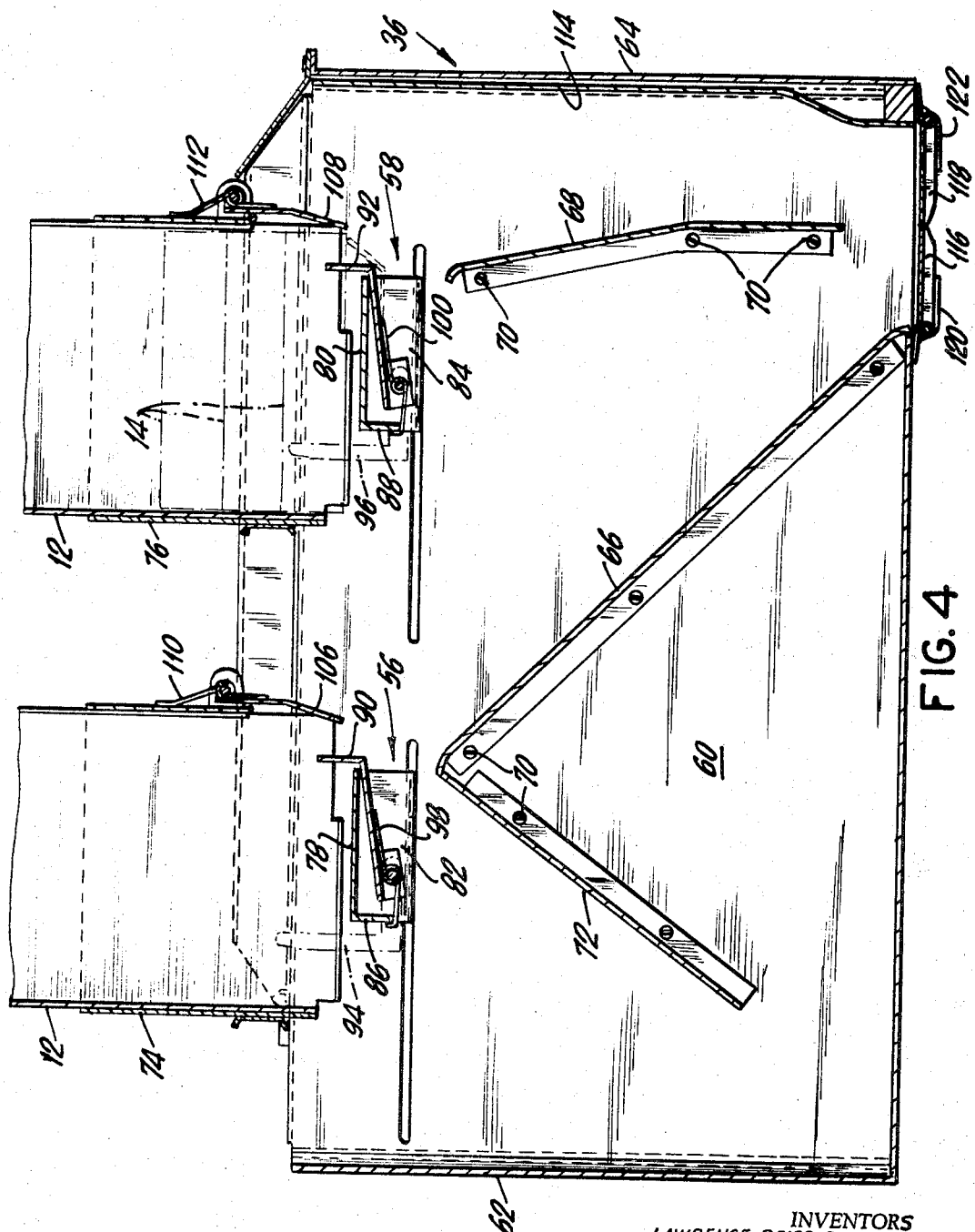

INVENTORS
LAWRENCE REISS, DECEASED,
By LINDA REISS KIRSCHNER, EXECUTRIX.
JOSEPH TORSIELLO

By Kenyon & Kenyon

ATTORNEYS

INVENTORS
LAWRENCE REISS, DECEASED,
By LINDA REISS KIRSCHNER, EXECUTRIX
JOSEPH TORSIELLO

ATTORNEYS

United States Patent Office 3,416,429
Patented Dec. 17, 1968

3,416,429
FOOD DISPENSING MACHINE
Joseph Torsiello, Pinebrook, N.J., and Lawrence Reiss, deceased, late of Old Westbury, N.Y., by Linda Reiss Kirschner, executrix, New York, N.Y., assignors to Micro Vend, Inc., Newark, N.J., a corporation of New York
Filed Oct. 14, 1966, Ser. No. 587,942
15 Claims. (Cl. 99—327)

ABSTRACT OF THE DISCLOSURE

A food dispensing machine for dispensing articles of food in either a heated or a non-heated state. A plurality of vertically disposed storage racks are disposed within a refrigerated chamber in the upper portion of the machine. At least one of the storage racks is adapted to deliver an article of food to a microwave oven, wherein the article of food is heated. After the heating cycle is completed, the heated article of food is delivered from the microwave oven to a receptacle bin. Individual selector mechanisms are provided to permit an operator of the dispensing machine to select either an unheated or a heated article of food. Means are provided to deliver unheated articles of food directly from certain of the storage racks to the receptacle bin, thereby bypassing the microwave oven.

---

This invention relates to a food dispensing machine and more particularly to a food dispensing machine which dispenses both hot and cold foods.

Coin-operated machines for dispensing various kinds of food and drink to a prospective customer are well known. It is often desirable to incorporate into a single machine foods which are dispensed both hot or cold, depending upon the choice of the purchaser. In machines which keep food continuously heated, the item of food has often been delivered to the purchaser in a soggy and unpalatable condition. This sogginess is caused by condensation within the sealed glassine or plastic wrapping about the item of food. It has also been the practice in such machines to display the items of hot food through glass windows, so that the prospective purchaser may select the type of food which he desires from visual inspection. Where the item of food has been stored in the dispensing machine for a period of time in a heated condition, it will often appear unappetizing to the customer, thus dissuading the customer from using the machine again. In machines where the customer is allowed to see the item of food, it is common to have a drum type of storage and delivery unit from which the customer removes the item of food through a door. This type of storage and delivery limits the capacity of the machine or, where greater storage capacity is desired, the size of the machine must be increased.

Where it is desired to dispense both hot and cold foods from the same machine, it has been the practice to have two separate storage chambers which must be sufficiently insulated from one another, and which must be separately heated and cooled. This necessitates provision of a separate heating unit and a separate cooling unit, thus increasing the bulk of the machine.

It is an object of the present invention to provide a new and improved food dispensing machine which is capable of dispensing items of food in either a hot or a cold condition.

It is a further object of the present invention to provide a new and improved food dispensing machine which is compact and which has a substantial storage capacity.

It is yet another object of the present invention to provide a new and improved food dispensing machine which delivers an item of food to a purchaser in a fresh and palatable state.

It is still another object of the present invention to provide a new and improved food dispensing machine which stores pre-cooked food in a refrigerated state but which dispenses an item of food previously refrigerated in a heated state.

It is a yet further object of the present invention to provide a new and improved food dispensing machine wherein condensation formed in the refrigerated storage space is prevented from entering into the heating and cooking unit of the machine, and wherein condensation during the cooking cycle is eliminated.

Other and further objects will become evident to those skilled in the art from the following description and drawings wherein:

FIG. 4 is a partially sectional side elevational view taken along line 4—4 of FIG. 3;

Figure 1:
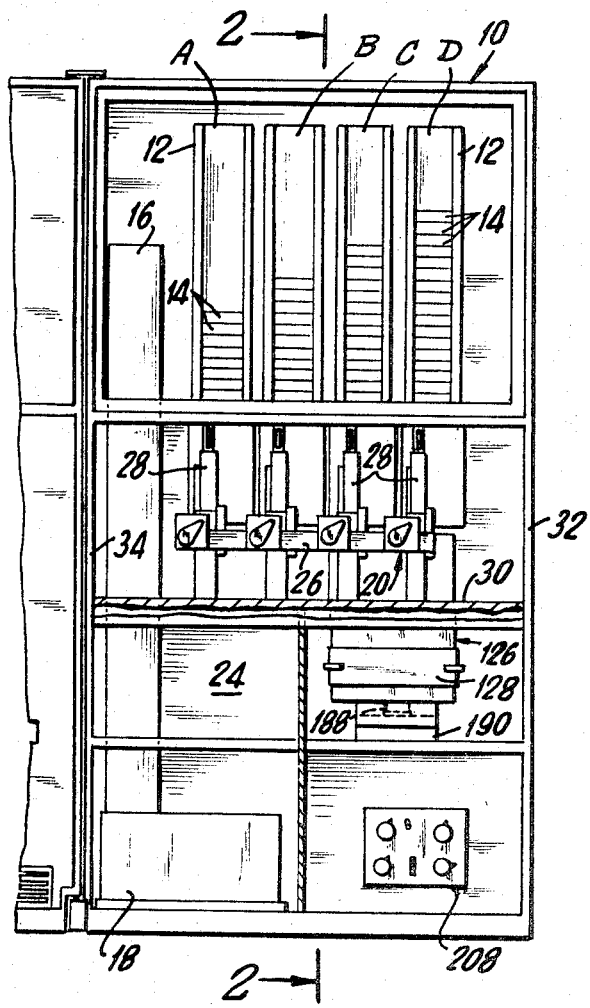
FIG. 1 is a front elevational diagrammatic view of the food dispensing machine of the present invention.
Figure 2:
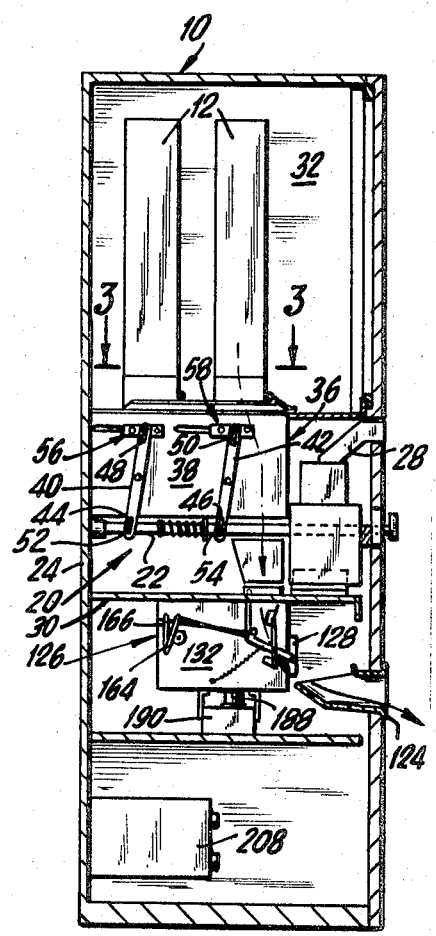
FIG. 2 is a side elevational diagrammatic view taken along line 2—2 of FIG. 1.

Referring now to FIGS. 1 and 2, there is shown diagrammatically a preferred embodiment of the present invention. As shown, a cabinet 10 is provided with a plurality of storage racks 12 for storing a plurality of articles of food. As shown, the articles of food are disposed in suitable containers such as boxes 14 stacked one on top of the other within storage rack 12. As shown, racks 12 are disposed in two rows, one row in the front and one row in the rear of cabinet 10. In this manner the racks are paired in lines A, B, C, and D. Lines A and B are adapted to deliver unheated articles of food to a receptacle bin, there to be removed by a purchaser. Lines C and D are adapted to deliver articles of food to a microwave oven, to be hereinafter described, thereafter to be delivered to a receptacle bin in a heated condition. A suitable selector mechanism to be described hereinafter permits a purchaser to select an article of food from either the front or rear rack of a pair in a line. Racks 12 may be of any suitable material such as metal and are open at the top to permit insertion of articles to be stored. Racks 12 are situated within a refrigerated chamber, refrigeration being accomplished by cool air being pumped into the upper portion of the refrigerated chamber through conduit 16 from refrigerating unit 18. Conduit 16 is positioned along the rear wall of cabinet 10 and provides extra storage apart from racks 12.

A selector mechanism 20 is provided for each pair of racks 12. Selector mechanism 20 comprises an operating member 22 journalled in rear wall 24 of cabinet 10 and longitudinal member 26 at the front of cabinet 10. Longitudinal member 26 is supported by coin mechanisms 28 which are in turn supported by horizontal member 30 mounted on side walls 32 and 34 of cabinet 10.

A forward and rearward pair of racks 12 are mounted on a chute frame 36 to be described in greater detail hereinafter. Pivotally mounted on the side wall 38 of chute frame 36 are a pair of members 40 and 42. Members 40 and 42, respectively, have slots 44 and 46 at their lower ends, and slots 48 and 50 at their upper ends. Pins 52 and 54 on member 22 selectively engage either slot 44 of member 40 or slot 46 of member 42, depending upon the rotational position of member 22. Members 40 and 42 respectively slidably engage food ejector members 56 and 58 slidably mounted in side wall 38 of chute frame 36. The manner in which articles are ejected from racks 12 by members 56 and 58 will be described in greater detail hereinafter. In general, however, operating member 22, which is slidably and rotatably mounted within cabinet 10, selectively acts upon either member 40 or member 42 according to the rotational position to which a prospective customer has turned member 22. For example, if member 22 has been rotated to the right, pin 54 on member 22 will engage slot 46 of member 42, whereas pin 52 will be out of engagement with slot 44 of member 40. Forward movement of member 22 will cause rearward movement of member 58 by means of pivotally mounted member 42. As described hereinafter, member 58 will then engage an item of food to be dispensed, and force the item into chute frame 36 when member 22 is moved rearwardly.

Figure 3:
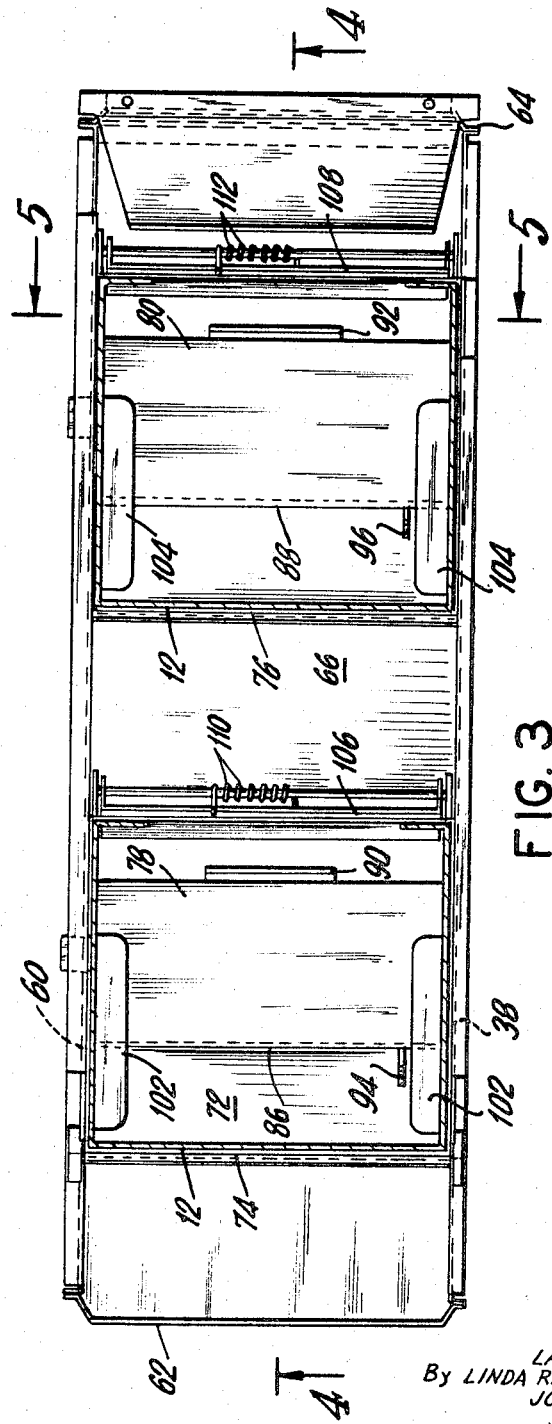
FIG. 3 is a partially sectional plan view taken along line 3—3 of FIG. 2.
Figure 5:
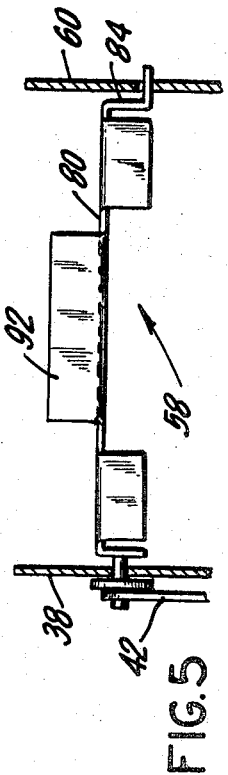
FIG. 5 is a partially sectional elevational view taken along line 5—5 of FIG. 4.

Referring now to FIGS. 3, 4, and 5, there will be described in greater detail the chute frame 36 and the manner of ejection of articles from racks 12 into frame 36. As shown, chute frame 36 comprises side walls 38 and 60, rear wall 62 and front wall 64. Slides 66 and 68 are affixed to side walls 38 and 60 by suitable fasteners such as screws 70. Bracing member 72 is also mounted on side walls 38 and 60. Racks 12 are mounted on the top of frame 36 by being force-fitted into brackets 74 and 76 mounted on frame 36. This manner of mounting allows for easy removal and insertion of racks 12. As pointed out hereinabove, ejector members 56 and 58 are slidably mounted in side walls 38 and 60. As shown, members 56 and 58 respectively comprise transverse members 78 and 80, angled side members 82 and 84, rearward transverse members 86 and 88, ejection members 90 and 92, and angled locking members 94 and 96. Members 90 and 92 are journalled in the side walls of members 56 and 58 and spring biased upwardly by springs 98 and 100. Locking members 94 and 96 are also journalled on members 56 and 58 and are normally spring biased upwardly.

Oppositely disposed inwardly projecting seating members 102 and 104 are provided to hold boxes 14. Flop gates 106 and 108 are respectively pivotally mounted on the front wall of brackets 74 and 76. Gates 106 and 108 are normally biased rearwardly by springs 110 and 112.

Ejection of a box 14 from racks 12 is accomplished as follows: When member 22 has been rotated to operatively engage either member 40 or member 42, frontward and rearward movement of member 22 will cause frontward and rearward movement of either ejector member 56 or member 58. For example, if it is desired to eject a box 14 from front racks 12, operating member 22 would be rotated to operatively engage member 42.

Ejector member 58 is normally in the forward position. When racks 12 contain boxes 14, the weight thereof will press members 92 and 96 downwardly. Forward movement of member 22 will cause rearward movement of ejector member 58. Since locking member 96 is pressed downwardly, it will clear the rear wall of racks 12. When member 58 has been moved to its farthest position rearwardly (to the left as seen in FIG. 4), the upwardly projecting portion of ejector member 92 will clear the rear wall of the box 14 with which it is in contact, and will be spring biased upwardly by spring 100. When member 22 is pushed rearwardly, member 58 will be caused to move forwardly. The front face of member 92 is caused to engage the rear face of lower box 14 in racks 12, thus to push it forwardly as member 58 moves forwardly. Forward movement of lowermost box 14 will cause gate 108 to swing counterclockwise. Eventually, box 14 will be pushed out of racks 12 by member 92 and will fall through the chute formed by front wall 114 of frame 36 and slide 68. Another box 14 will drop down, ready to be acted upon by member 58, box 14 pushing members 92 and 96 downwardly.

If racks 12 have been emptied of food boxes 14, locking member 96 will prevent rearward movement of member 58 by abutting against the rear wall of racks 12. This locking action will indicate to the customer that the selected item is out.

In similar manner, member 56 would act upon boxes stored in racks 12 to eject them onto slide 66.

After individual box 14 has been ejected from one of the racks 12, it will fall through chute frame 36 and force gates 116 and 118 open. Gates 116 and 118 are respectively normally biased closed by spring 120 and 122. Gates 116 and 118 are of heat insulating material to prevent condensation from dropping into the chamber below. As will be described hereinafter, a microwave heating and cooking oven is located beneath at least one chute frame 36. It is desirable to prevent condensation from dropping into the oven, so that the food in a container 14 may be properly cooked, and so that condensation does not shortout the electrical power and control system associated with said oven. After a container has passed through gates 116 and 118, the gates will return to their normally biased closed position.

If a cold food article has been selected, the container 14 holding the article of food will drop into receptacle bin 124 (see FIG. 2) where it is removed by the purchaser. If, on the other hand, an article of food has been selected which is to be delivered to the purchaser cooked, the container 14 containing the article of food will fall into microwave oven 126, where the article of food will be cooked and heated for a pre-determined amount of time. After the heating cycle has been completed, front door 128 of oven 126 will open to allow the cooked article of food within container 14 to drop into bin 124 for removal by the purchaser.

Figure 6:
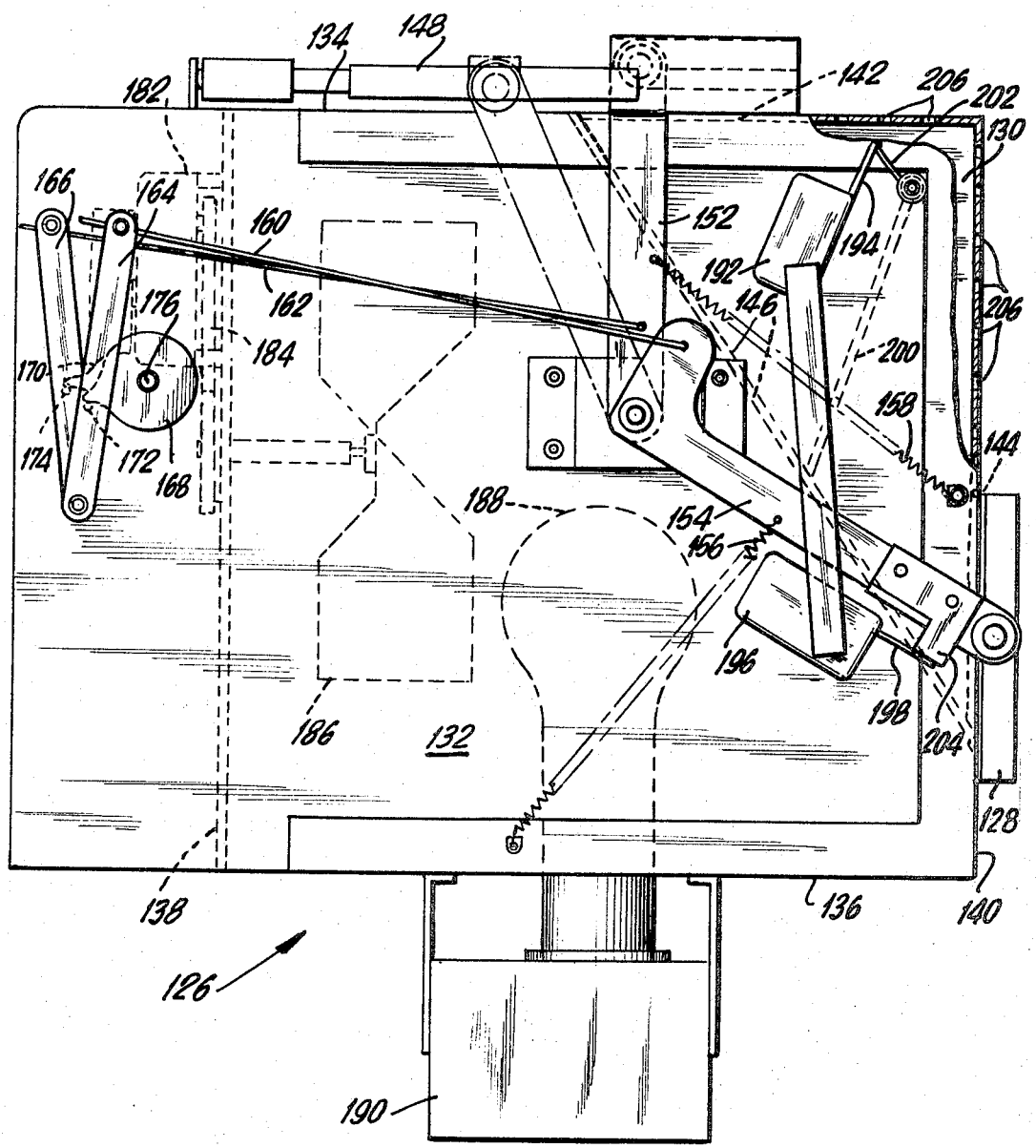
FIG. 6 is a partially sectional elevational view of the microwave oven of the present invention.
Figure 7:
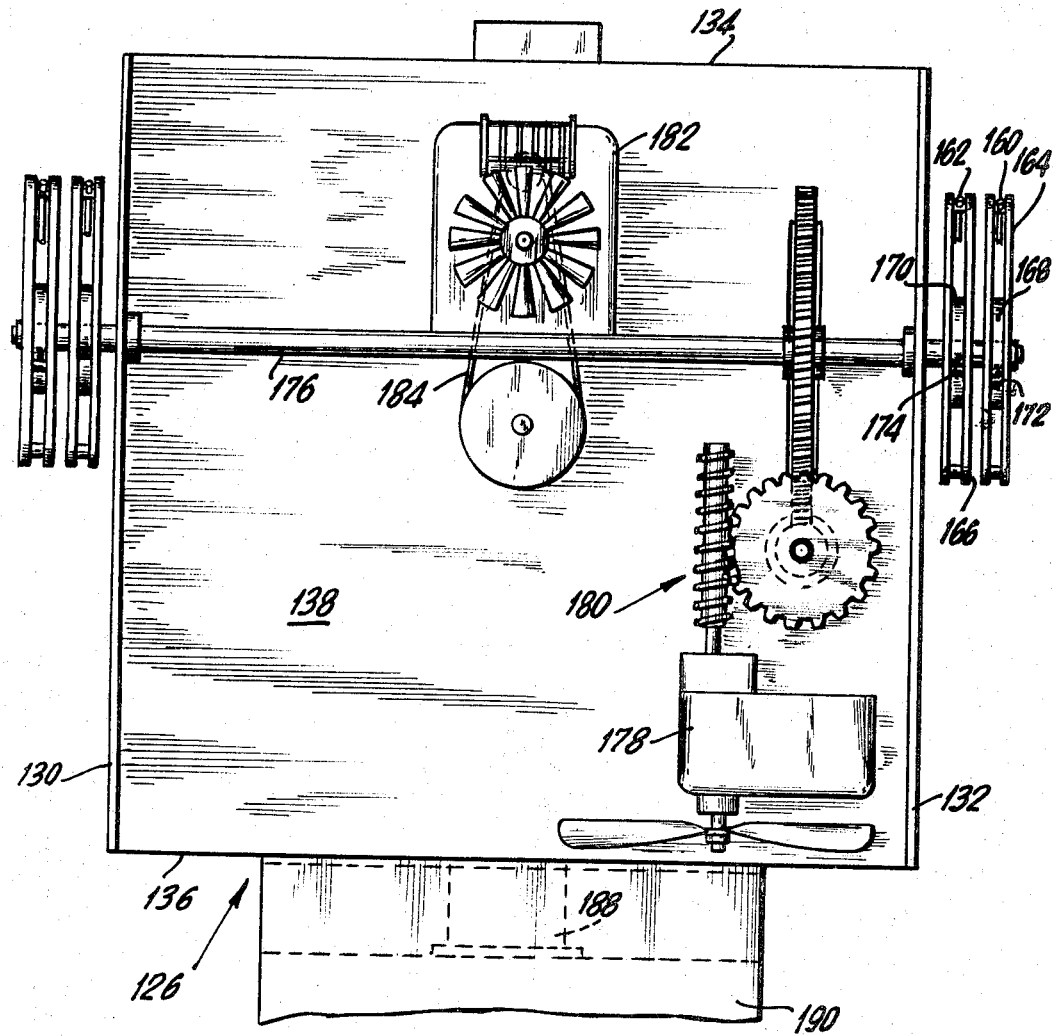
FIG. 7 is a rear elevational view of the oven of FIG. 6.

Referring now to FIGS. 6 and 7, there will be described in greater detail microwave oven 126. As shown, oven 126 comprises side walls 130 and 132, top wall 134, bottom wall 136, rear wall 138, and front wall 140. Walls 130–140 of oven 126 may be of any suitable rigid material such as aluminum or the like. Top wall 134 is provided with an opening 142 for the reception of a container 14 into oven 126. Front wall 140 is provided with an opening 144 to permit ejection of a container having an article of food which has been cooked by oven 126.

Disposed within oven 126 is a slide 146. Slide 146 is of a material which will allow microwaves to freely pass through with minimum loss of efficiency of the heating effect of the microwaves. Such a material, for example, would be fiber glass, polypropylene, or the like. It has been found that polypropylene is especially suitable in the instant application to provide the greatest heating efficiency.

Oven 126 is provided with a cover 148 for covering opening 142 in upper wall 134. In like manner, door 128 is provided to cover opening 144 in front wall 140. Cover 148 is mounted on a pair of arms 152 journalled in side walls 130 and 132 of oven 126. Door 128 is similarly mounted on lever arms 154, also journalled in side walls 130 and 132.

As shown in FIG. 6, door 128 is normally biased closed by the action of spring 156 on arm 154. Similarly, door 148 is normally biased closed by the action of spring 158 on arm 152. Counteracting these biasing forces are rods 160 and 162, respectively attached at their one ends to arms 154 and 152 and at their other ends to lever arms 164 and 166 journalled at the rear of wall 132. Cams 168 and 170 respectively bear upon cam followers 172 and 174 of arms 164 and 166.

Cams 168 and 170 are mounted on rotatable shaft 176 journalled in walls 130 and 132. A motor 178 is mounted on rear wall 136 and is linked to shaft 176 through a gear train 180. Thus, rotation of the rotor of motor 178 causes rotation of shaft 176 and cams 168 and 170 mounted thereon. The speed of motor 178 and the gear reduction ratio of gear train 180 determine the speed at which shaft 176 will rotate. As will be explained hereinafter, this speed determines the operation cycle of microwave oven 126.

A second motor 182 is mounted on rear wall 136 and is linked through drive belt 184 to a fan 186 disposed within oven 126. A microwave source 188 is also disposed within oven 126 and is powered by microwave energy source 190. Microwave source 188 may, for example, be a magnetron tube and energy source 190 the appropriate circuitry for powering said magnetron tube. Fan 186 acts to increase the efficiency of oven 126 during the heating and cooking cycle.

Microswitch 192 having arm 194 is mounted on wall 132 of oven 126. A second microswitch 196 having switch arm 198 is likewise mounted on wall 132.

Disposed within the heating chamber of oven 126, said heating chamber being formed by segments of walls 130, 132, 134, and 140, as well as slide 146, is a gate 200 journalled in walls 130 and 132. Gate 200 is provided with an arm 202 which bears against switch arm 194 of microswitch 192. Lever arm 154 is provided with a projecting member 204 which bears against switch arm 198 of microswitch 196. The function of switches 192 and 196 will be described hereinafter.

Microwave oven 126 operates as follows: Door 148 is normally maintained in the open position by the action of cam 170 bearing on follower 174 and thence acting to hold arm 152 back through arm 166 and rod 162. When a box containing an article of food drops into oven 126, the box will strike gate 200, and thus actuate microswitch 192 through the action of arm 202 on switch arm 194. Actuation of microswitch 192 turns motor 178 on. The operation of motor 178 causes shaft 176 to rotate cam 170 out of contact with cam follower 174, thus allowing spring 158 to close door 148 over opening 142. Fan 186 and microwave source 188 will also be activated to provide cooking of the article within oven 126. The length of time of the heating and cooking cycle is determined by the nature of the food to be cooked. Normally, this time would last from ten to twenty seconds.

After the cooking cycle has been completed, cam 168 will have rotated into engagement with cam follower 172. Further rotation of cam 168 causes lever arm 164 to act upon door 128 through rod 160 and arm 154 to open door 128 and allow the cooked article of food to fall by gravity out of oven 126.

Meanwhile, cam 170 has re-engaged itself with cam follower 174 to re-open door 148 in preparation for the next cooking cycle. Disengagement of member 204 from switch arm 198 actuates switch 196 to deactivate motors 178 and 182 and microwave source 188. Meanwhile, cam 168 has disengaged from cam follower 172 and door 128 has been allowed to return to its normally biased closed position.

In order to reduce condensation during the heating and cooking cycle, perforations 206 are provided in the walls forming a part of the heating chamber, i.e., walls 130, 132, 134, and 140. These perforations allow any condensation formed to evaporate therethrough and thus to keep the article of food free from sogginess.

Cabinet 10 is provided with a power supply 208 for supplying the power necessary for effectuating the power and control functions of the food dispensing machine.

In summary, the food dispensing machine described hereinabove operates as follows: Indicated on the front of the machine are various articles of food stored within the machine. As shown in FIGS. 1 and 2, eight storage racks are provided, four racks for storing articles of food which are to be dispensed in the cold state, and four racks for storing articles of food which are to be dispensed in a cooked state. During storage, all of the articles of food are kept refrigerated in order to maintain their freshness.

When a prospective purchaser desires to purchase an individual article of food, he inserts the proper coin within the coin mechanism 28 associated with the article of food desired. Insertion of the coin into coin mechanism 28 allows the customer to operate the appropriate selector member 22. If a cold article of food is desired, actuation of member 22 will eject the desired article of food from the appropriate storage rack 12 into bin 124.

When the article of food selected is to be heated, actuation of member 22 will cause the appropriate container of food to drop into microwave oven 126. Oven 126 will be thereby activated and the pre-determined cooking cycle will take place. When the cooking cycle has ceased, door 128 will open to eject the cooked article into bin 124.

Although a preferred embodiment of the present invention has been described hereinabove, it will be understood that modifications well known to those skilled in the art may be made within the scope of the present invention. Thus, although eight storage racks have been shown, it will be understood that any number less or more than eight are contemplated to be within the present invention, and said invention is not to be limited by the specific number of storage racks. In like manner, although a specific selector mechanism has been described, it will be understood that any suitable mechanism or electrical selector mechanism may be substituted therefor.

It will thus be seen that the food dispensing machine of the present invention is highly compact and is adapted to dispense both hot and cold articles of food. The articles of food during storage are kept in a refrigerated state, thus assuring freshness when the article is dispensed to a prospective customer. When the article of food to be dispensed is to be cooked, the microwave oven of the present invention quickly cooks the food and prevents the article of food from becoming soggy due to condensation during the cooking cycle, thus providing for dispensing of hot food which is both palatable and appealing to the eye. Means are provided in the present invention for insulating the refrigeration compartment from dropping into the oven from the refrigeration compartment, thus eliminating breakdown of the oven due to short-circuiting or the like. The storage racks and chutes are of such dimensions that boxes containing hamburgers, hot dogs and the like, may be stored and dispensed in a cooked condition.

Although preferred embodiments of the present invention have been described hereinabove, it will be understood that the scope of the present invention is not to be limited by such embodiments, but rather is to be determined by the following claims.

What is claimed is:

1. A food dispensing machine comprising a cabinet, a refrigeration compartment in the upper portion of said cabinet, first and second storage rack means for storing articles of food mounted in said refrigeration compartment of said cabinet, receptacle means, a microwave oven, means for preventing condensation from said re- of food in an unheated state directly into said receptacle means for selectively ejecting an article of food from said second storage rack means into said microwave oven, means for preventing condensation from said refrigeration compartment from entering said oven, control means for causing said microwave oven to heat and cook said article of food for a heating and cooking cycle of predetermined period fo time, said oven having means for preventing condensation from forming during said heating and cooking cycle, and means for ejecting said article of food in a heated and cooked state from said microwave oven into said receptacle means after said predetermined period of time has ended.

2. The food dispensing machine of claim 1 wherein said receptacle means is receptacle bin adapted to receive articles of food from said first storage rack means and said microwave oven.

3. The food dispensing machine of claim 1 wherein said first and second storage rack means comprises a plurality of storage racks which are vertically disposed and paired in front and rear rows and wherein a single selector means for ejecting articles of food is provided for each pair of racks.

4. The food dispensing machine of claim 1 wherein said refrigeration comaprtment is refrigerated by a duct delivering cooled air at the rear and in the upper portion of said compartment.

5. The food dispensing machine of claim 1 wherein said means for preventing condensation from said refrigeration compartment from entering said microwave oven comrpises insulated gates separating said compartment from said oven, and wherein said means of said oven for preventing condensation from forming during the heating and cooking cycle comprises a plurality of perforations made in said outer walls of said oven and opening into the heating and cooking chamber of said oven.

6. A food dispensing machine comprising a cabinet, a refrigeration compartment in the upper portion of said cabinet, first and second storage rack means for storing articles of food mounted in said refrigeration compartment of said cabinet, each of said first and said second storage rack means having at least one pair of frontwardly disposed and rearwardly disposed storage racks, receptacle means, a microwave oven, means for preventing condensation from said refrigeration compartment from entering said oven, first selector means for selectively ejecting an article of food in an unheated state from one of said pair of racks of said first storage rack means into said receptacle means, second selector means for selectively ejecting an article of food from one of said pair of racks of said second storage rack means into said oven, control means for causing said microwave oven to heat and cook said article of food for a heating and cooking cycle, said oven having means for preventing condensation from forming during said heating and cooking cycle, and means for ejecting said article of food in a heated and cooked state from said microwave oven into said receptacle means after said predetermined period of time has ended.

7. The food dispensing machine of claim 6 wherein said receptacle means comprises a receptacle bin adapted to receive articles of food either in a heated and cooked state from said microwave oven or in an unheated state from said first storage rack means.

8. The food dispensing machine of claim 6 wherein said refrigeration compartment is refrigerated by a duct delivering cooled air at the rear and in the upper portion of said compartment.

9. The food dispensing machine of claim 6 wherein said control means includes means for activating said microwave oven when an article of food is received therein.

10. A food dispensing machine comprising a cabinet, a refrigeration compartment in the upper portion of said cabinet, a plurality of storage racks for storing articles of food mounted in said refrigeration compartment, a microwave oven, at least one of said storage racks being disposed in relation to said oven to deliver an article of food to said microwave oven, first selector means for selecting and ejecting an article of food from said at least one storage rack to said microwave oven, control means for causing said microwave oven to heat and cook an article of food for a heating and cooking cycle, said control means being adapted to be activated when an article of food is received in said microwave oven, receptacle means for receiving an article of food in a heated and cooked state from said oven after said heating and cooking cycle has ended, at least one other of said storage racks being disposed to deliver an article of food in an unheated state directly to said receptacle means, second selector means for selecting and ejecting an article of food from said at least one other of said storage racks to said receptacle bin in an unheated state, means for preventing condensation from entering said oven from said refrigeration compartment and means for preventing condensation from forming during said heating and cooking cycle of said oven.

11. The food dispensing machine of claim 10 wherein said means for preventing condensation from entering said oven comprises insulated gates separating said compartment from said oven, and wherein said means for preventing condensation from forming during said heating and cooking cycle comprises a plurality of perforations made in the outer walls of said oven and opening into the heating and cooking chamber of said oven.

12. In a food dispensing machine for dispensing heated and cooked articles of food, a microwave oven comprising a cabinet, said cabinet having a heating and cooking chamber, said cabinet having a wall having an entrance aperture opening into said heating and cooking chamber, said cabinet having a second wall having an exit aperture opening into said chamber, a first cover movably mounted on said cabinet for covering said entrance aperture and a second cover movably mounted on said cabinet for covering said exit aperture, a source of microwave energy, said oven having a separate chamber in which said source of microwave energy is disposed, a fan disposed within said separate chamber of said oven, a first motor mounted on said cabinet connected to said fan for causing said fan to rotate, a second motor mounted on said cabinet, a first linkage connected to said first cover, a second linkage connected to said second cover, control means connected to said second motor and to said first and said second linkages, said control means causing said first cover to be removed from said entrance aperture and said second cover to be over said exit aperture prior to the entrance of an article of food into said heating and cooking chamber, activating means activated by an article of food entering said heating and cooking chamber through said entrance aperture, said control means causing said first door to be closed over said entrance aperture when said activating means is activated, means for causing said source of microwave energy to emit microwaves for a predetermined cooking and heating cycle, said means being activated by said activating means, said control means causing said second cover to be opened after said heating and cooking cycle has been completed, thereby to allow ejection of a heated and cooked article of food from said oven.

13. In a food dispensing machine for dispensing heated and cooked articles of food, the microwave oven of claim 12, wherein said heating and cooking chamber is separated from said chamber in which said source of microwave energy is disposed by a wall of polypropylene material.

14. In a food dispensing machine for dispensing heated and cooked articles of food, the microwave oven of claim 12 including means for prevening condensation from forming in said heating and cooking chamber during the heating and cooking cycle.

15. In a food dispensing machine for dispensing heated and cooked articles of food, a microwave oven according to claim 14, wherein said condensation-preventing means comprises a plurality of perforations within the walls of said oven surrounding the cooking and heating chamber.

References Cited

UNITED STATES PATENTS

| 2,501,712 | 3/1950 | Chodziesner | 99—357 |
| 2,614,480 | 10/1952 | Elmer | 99—327 |
| 2,733,650 | 2/1956 | Williams | 99—327 |
| 2,950,024 | 8/1960 | Adler | 99—357 UXR |
| 3,127,495 | 3/1964 | Polries et al. | 219—10.55 |
| 3,165,186 | 1/1965 | Zeiter | 221—150 XR |
| 3,224,361 | 12/1965 | Ojelid | 99—357 XR |
| 3,233,536 | 2/1966 | Ignelzi | 99—357 |
| 3,308,261 | 3/1967 | Velander | 219—10.55 |
| 3,333,666 | 8/1967 | Murray et al. | 99—357 UXR |
| 3,335,656 | 8/1967 | Smith | 99—357 |

BILLY J. WILHITE, *Primary Examiner.*

U.S. Cl. X.R.

219—10.55, 221—150, 99—335, 357

UNITED STATES PATENT OFFICE
CERTIFICATE OF CORRECTION

Patent No. 3,416,429 December 17, 1968

Joseph Torsiello et al.

It is certified that error appears in the above identified patent and that said Letters Patent are hereby corrected as shown below:

Column 6, cancel "means for preventing condensation from said re-" and insert -- first selector means for selectively ejecting an article --; line 53, after "means" insert -- , second selector means --; line 55, "prevening" should read -- preventing --; line 59, "fo" should read -- of --.

Signed and sealed this 10th day of March 1970.

(SEAL)
Attest:

Edward M. Fletcher, Jr.
Attesting Officer

WILLIAM E. SCHUYLER, JR.
Commissioner of Patents